March 8, 1932. F. P. RYDER 1,848,273
STRIPPING ROLLER FOR STRING BEAN HARVESTERS
Filed July 20, 1928
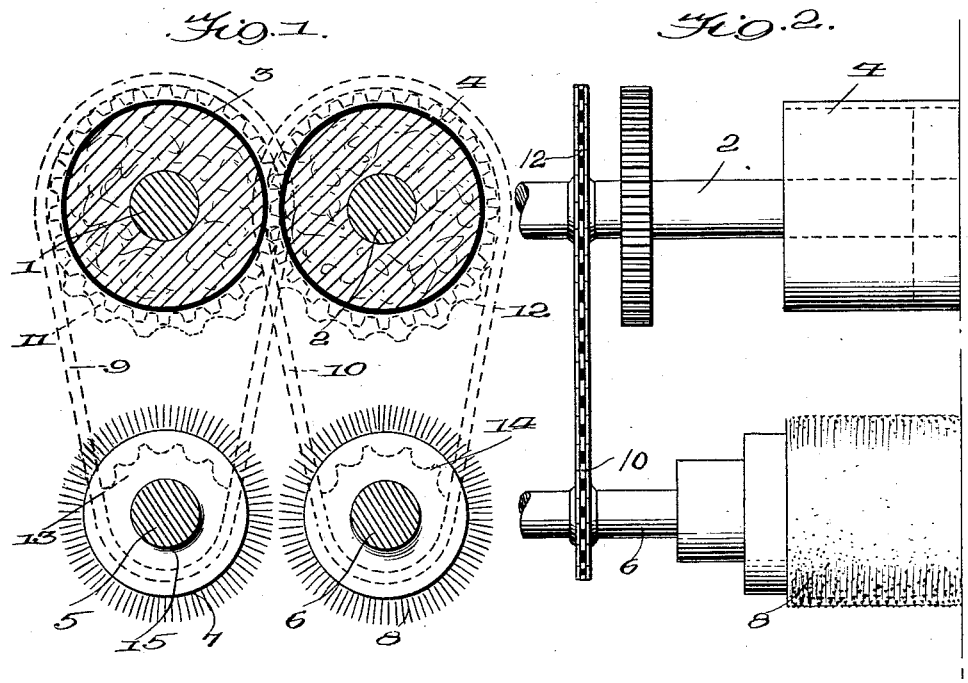
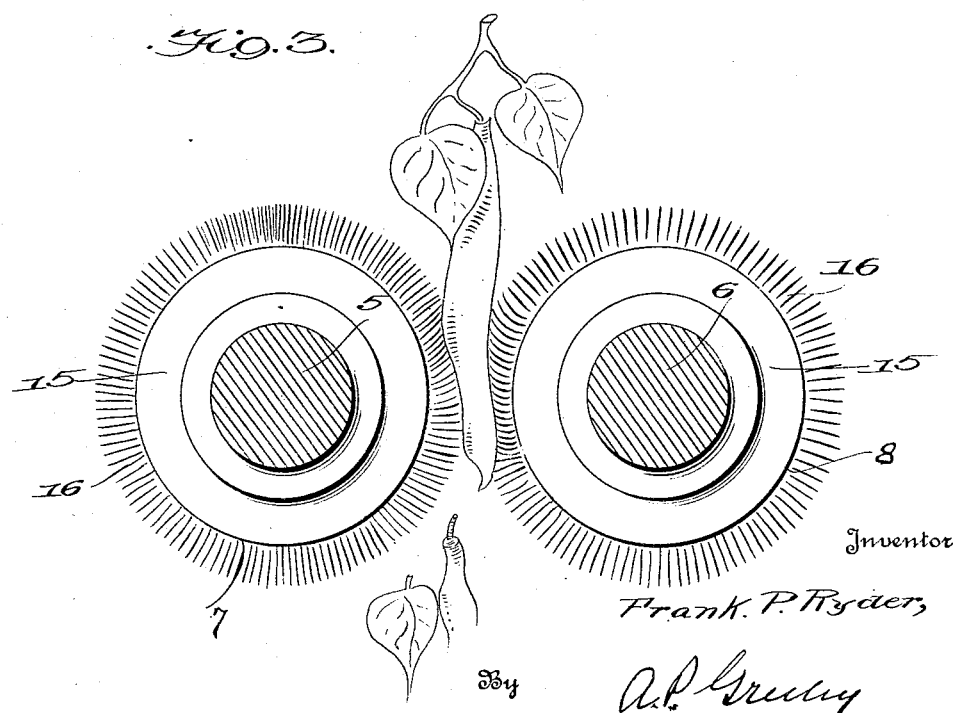

Patented Mar. 8, 1932

1,848,273

UNITED STATES PATENT OFFICE

FRANK PITTIS RYDER, OF NIAGARA FALLS, NEW YORK

STRIPPING ROLLER FOR STRING BEAN HARVESTERS

Application filed July 20, 1928. Serial No. 294,209.

My invention relates to string bean harvesters in which the bushes or vines on which the beans are grown are gripped by rollers and the beans are acted on by other rollers to strip or pull them from the bushes or vines and my present invention relates particularly to the construction of the stripping rollers by which the beans are stripped or pulled free from the vines.

In my application for Letters Patent of the United States filed November 9, 1927, Serial No. 232,119, of which the present case constitutes a continuation in part I have shown means for gripping bean bushes or vines and stripping the beans from them in combination with means for separating the beans so stripped from the bushes or vines, from the leaves or stalks which are stripped off with them. It is the object of my present invention to provide stripping rollers of different construction from those shown in the said application, simpler and less expensive and better adapted to effect the stripping.

With the objects above indicated and other objects hereinafter explained in view, my invention consists in the construction and combination of elements hereinafter described and claimed.

Referring to the drawings:

Figure 1 is a vertical cross-sectional view of gripping and stripping rollers embodying my invention.

Figure 2 is a side view of the same, and

Figure 3 is a cross-sectional view of the gripping rollers showing them in operation on the beans.

In the drawings 1 and 2 indicate a pair of horizontally arranged parallel shafts each carrying an elastic gripping roller 3 on shaft 1 and 4 on shaft 2 and 5 and 6 indicate respectively one of a pair of horizontally arranged parallel shafts arranged below and parallel with shafts 1 and 2, carrying respectively stripping rollers 7 and 8, and arranged to be driven by sprocket chains 9 and 10 from sprocket gears 11 and 12 carried respectively by shafts 1 and 2, and sprocket gears 13 and 14 carried by shafts 5 and 6, these sprocket gears 13 and 14 being of less diameter than sprocket gears 9 and 10 on shafts 1 and 2 so that the peripheral speed of the stripping rollers 7 and 8 will be greater than the peripheral speed of gripping rollers 3 and 4. The arrangement and means for driving the gripping rollers and the stripping rollers is or may be the same as that shown in my application for Letters Patent of the United States filed November 9, 1927, Serial No. 232,119.

In my application referred to the gripping rollers and the stripping rollers are described as formed of a core of spongy rubber with a covering of pure rubber. In my present application the gripping rollers 3 and 4 are preferably of spongy rubber covered with pure rubber but instead of using this construction for the stripping rollers I prefer to construct them as cylindrical brushes consisting of a core 15 in which are secured the inner ends of bunches of bristles 16 so that the free ends of the bristles extend radially outward from the shafts.

In the gripping rollers constructed as shown and described in my application referred to the rollers are adapted in gripping the beans to yield radially inward, that is, toward the shafts on which they are carried as well as, to some extent, tangentially. The bristles of the brush rollers of the present application cannot yield radially inward and can yield only tangentially and for this reason, by their elasticity exert a stronger pulling or stripping effect upon the beans, tending to strip them more quickly from the bushes or vines held back by the gripping rollers.

The gripping rollers constructed as described in my application referred to are particularly adapted for gripping the bushes or vines. I do not desire to be limited to the use of such gripping rollers as other constructions may be used by which the bushes or vines are so gripped as to hold them without injury to the beans against the pull of the stripping rollers.

The bristles 16 should be relatively stiff so as to exert a strong pulling or stripping action on the beans but must not be sufficiently stiff to abrade or otherwise injure the beans.

Having thus described my invention what I claim is:

1. In a machine for separating string beans from the plants on which they were grown the combination of gripping rolls adapted to feed the beans in a downward direction and stripping rolls arranged below said gripping rolls adapted to grip the beans as they pass downward from the feeding means, means for driving the gripping rolls and means for so driving the stripping rolls that their peripheral speed will be greater than the peripheral speed of the gripping rolls to thereby draw the beans downward with sufficient force to pull them away from the bushes.

2. In a machine for separating string beans from the plants on which they were grown the combination of gripping rolls adapted to feed the beans in a downward direction and stripping rolls arranged below said gripping rolls having peripheral surfaces adapted to yield tangentially to grip the beans as they pass downward from the feeding means, means for driving the gripping rolls and means for so driving the stripping rolls that their peripheral speed will be greater than the peripheral speed of the gripping rolls to thereby draw the beans downward with sufficient force to pull them away from the bushes.

3. In a machine for separating string beans from the plants on which they were grown the combination of gripping rolls adapted to feed the beans in a downward direction and stripping rolls arranged below said gripping rolls having their peripheral surfaces formed of bristles adapted to grip the beans as they pass downward from the feeding means, means for driving the gripping rolls and means for so driving the stripping rolls that their peripheral speed will be greater than the peripheral speed of the gripping rolls to thereby draw the beans downward with sufficient force to pull them away from the bushes.

4. In a machine for separating string beans from the plants on which they were grown the combination of gripping rolls adapted to feed the beans in a downward direction and stripping rolls arranged below said gripping rolls having their peripheral surfaces formed of radially extending bristles adapted to grip the beans as they pass downward from the feeding means, means for driving the gripping rolls and means for so driving the stripping rolls that their peripheral speed will be greater than the peripheral speed of the gripping rolls to thereby draw the beans downward with sufficient force to pull them away from the bushes.

5. In a machine for separating string beans from the plants on which they were grown a pair of gripping rolls having their axes in a substantially horizontal plane and having peripheral surfaces of yielding material adapted to receive between them the beans and portions of the plants and to feed them to stripping rolls and a pair of stripping rolls having their axes in a substantially horizontal plane arranged in position to receive the beans therefrom and means for rotating the stripping rolls at a greater peripheral speed than the peripheral speed of the gripping rolls.

6. In a machine for separating string beans from the plants on which they were grown a pair of gripping rolls having their axes in a substantially horizontal plane and having peripheral surfaces of yielding material adapted to receive between them the beans and portions of the plants and to feed them to stripping rolls and a pair of stripping rolls having their axes in a substantially horizontal plane arranged in position to receive the beans therefrom and means for rotating the stripping rolls at a greater peripheral speed than the peripheral speed of the gripping rolls, the peripheral surfaces of the stripping rolls being formed of outwardly projecting bristles.

7. In a machine for separating string beans from the plants on which they were grown, the combination of feeding means adapted to feed the beans in a downward direction at a predetermined rate of movement and means arranged below said feeding means adapted to grip the beans as they pass downward from the feeding means and to draw them downward at a rate of movement greater than the rate of movement imparted to them by the feeding means so as to pull them away from the bushes.

In testimony whereof, I hereunto affix my signature.

FRANK PITTIS RYDER.